(12) United States Patent
Vergöhl et al.

(10) Patent No.: US 7,985,489 B2
(45) Date of Patent: Jul. 26, 2011

(54) TEMPERATURE-RESISTANT LAYERED SYSTEM

(75) Inventors: Michael Vergöhl, Cremlingen-Destedt (DE); Christoph Rickers, Braunschweig (DE); Frank Neumann, Braunschweig (DE); Christina Polenzky, Braunschweig (DE)

(73) Assignee: Fraunhofer-Gesellschaft Zur Forderung Der Angewandten Forschung E.V, Munich (DE)

( * ) Notice: Subject to any disclaimer, the term of this patent is extended or adjusted under 35 U.S.C. 154(b) by 0 days.

(21) Appl. No.: 12/125,343

(22) Filed: May 22, 2008

(65) Prior Publication Data

US 2008/0278817 A1 Nov. 13, 2008

(51) Int. Cl.
*B32B 9/00* (2006.01)
(52) U.S. Cl. ......... 428/689; 428/697; 428/701; 428/702
(58) Field of Classification Search .................. 428/689, 428/697, 701, 702
See application file for complete search history.

(56) References Cited

U.S. PATENT DOCUMENTS

| | | | |
|---|---|---|---|
| 4,814,056 A * | 3/1989 | Welty | 204/298.11 |
| 4,968,117 A | 11/1990 | Chern et al. | |
| 5,179,469 A * | 1/1993 | Hall et al. | 359/360 |
| 5,475,531 A | 12/1995 | Rahmlow et al. | |
| 6,021,001 A | 2/2000 | Turner | |
| 6,190,511 B1 | 2/2001 | Wei | |
| 6,740,364 B2 * | 5/2004 | Lau et al. | 427/452 |
| 2003/0048666 A1 * | 3/2003 | Eldridge et al. | 365/185.28 |
| 2004/0070726 A1 | 4/2004 | Ishak | |
| 2008/0102259 A1 * | 5/2008 | Nikolov et al. | 428/213 |

FOREIGN PATENT DOCUMENTS

| | | |
|---|---|---|
| EP | 1390796 | 2/2004 |
| WO | WO-0227385 | 4/2002 |
| WO | WO-2005/060009 A1 | 6/2005 |

OTHER PUBLICATIONS

Fraunhofer-Institute; http://web.archive.org/web/*/http://www.rug-ate.fraunhofer.de/pages/page_01.html; Sep. 2005; XP002417170.
Fraunhofer-Gesellschaft; Rugate-Filter fur den nahen infraroten und visuellen Spektralbereich; http://web.archive.org/web/*/http://www.iof.fhg.de/departments/optical-coatings/nirvis/projects/rugate_content_d.html; Jul. 2004; XP002417187.
Rockwell International Science Center; Using Apodization Functions to Reduce Sidelobes in Rugate Filters; Applied Optics, vol. 28; Dec. 1989; p. 5091-5094.
A.G. Imenes et al.,: The Design of Broadband, Wide-Angle Interference Filters for Solar Concentrating Systems; Solar Energy Materials & Solar Cells; 2006; pp. 1579-1606.
H. Bartzsch et al.,; Silicon Oxynitride Rugate Filters Grown by Reactive Pulse Magnetron Sputtering; Proceedings of SPIE; vol. 5250; Bellingham, WA; 2004.

(Continued)

*Primary Examiner* — Gwendolyn Blackwell
(74) *Attorney, Agent, or Firm* — Gifford, Krass, Sprinkle, Anderson & Citkowski, P.C.

(57) ABSTRACT

The invention relates to a layered system of a component that can be thermally stressed, comprising at least one for expanding the application scope of layered systems and in particular for improving their life cycle. Said layer has at least one first and at least one second material and a mixture profile (1) that varies at least almost continuously with the layer thickness, without forming a boundary layer between the first and second material.

29 Claims, 8 Drawing Sheets

OTHER PUBLICATIONS

Jong-Gui Yoon et al.,; Structural and Optical Properties of TiO2-SiO2 Composite Films Prepared by Aerosol-Assisted Chemical-Vapor Deposition; Journal of the Korean Physical Society; vol. 33, No. 6, Dec. 1998, pp. 699-704.

Walter EL Johnson et al.; Introduction to Rugate Filter Technology; XP-002417267; SPIE vol. 2046; pp. 88-108; Wright Laboratory, Materials Directorate Wright-Patterson Air Force Base, Ohio 45433-7702.

* cited by examiner

TEMPERATURE-RESISTANT LAYERED SYSTEM

CROSS-REFERENCE TO RELATED APPLICATIONS

This application claims priority of PCT Application EP 2006/011233 filed on Nov. 23, 2006, which in turn claims priority to German Patent Application No 10 2005 056 110.1 filed on Nov. 23, 2005, both of which are incorporated herein by reference.

FIELD OF THE INVENTION

The invention relates to a layered system, particularly an optical layered system.

BACKGROUND OF THE INVENTION

Layered systems are used extensively for the functionalization of surfaces or components. For example, optical layered systems, which are constructed from optically high- and low-refraction materials applied alternately to a substrate, are used as optical interference filters. Thin film interference filters are known from many fields, such as, for example, architectural glass coating, laser optics, telecommunication/data transmission, decorative applications, eyeglass coatings, and general antireflective coating/mirror coating processes.

U.S. Pat. No. 6,021,001 describes a layered system as filter in which the given layers present different thicknesses to achieve a desired refractive index for filtering out special wavelengths. From EP 1 390 796 B1 a polarizing beam splitter is known, where a concurrently used rugate filter is manufacturable by the deposition of layers that have different thicknesses and are made from two different materials. Each layer has a different mixing ratio of the two materials.

The problem of the invention is to broaden the application range of layered systems and, particularly, to improve long-term stability.

SUMMARY OF THE INVENTION

This problem is solved by a layered system having the features of Claim 1, a component with the features of Claim 27, and a method of making. Advantageous embodiments and variants are indicated in the corresponding subordinate claims.

In a layered system according to the invention of a thermally stressed element with at least one layer, which presents at least a first and at least a second material, the layer presents a mixture profile that varies at least approximately continuously with a layer thickness, without the formation of a boundary layer between the first and second material.

Preferably, the continuously varying mixture profile allows the layered system to undergo a higher thermal stress. The functionality of the layered systems in applications is improved advantageously, where it is possible, for example, for temperature stresses of up to 1000° C. to occur during use. In particular, it becomes possible to have a low optical dispersion during thermal stress. For example, the layered system allows a reduction in the size of light bulbs that are coated with an optical function layer, where it is preferred that the thermal crystallization of the layer be at least reduced in comparison with conventional interference coatings, which are constructed, for example, with an alternating sequence of high- and low-refraction λ/4 layers. Preferably, the layered system allows use in temperature ranges that until now have not been accessible using conventional interference layered systems.

A component is an example of a thermally stressed element. For example, as a component, an optical component, an electrical component, an electronic component or a similar part can be provided. A temperature stress exists if the temperature is at least 150° C., particularly a temperature stress above a temperature of 300° C., preferably above 400° C. In particular, a thermal stress is a temperature stress of approximately 400-1000° C. The thermal stress capacity occurs in accordance with a design during the operation of the element. According to another embodiment, the thermal load occurs during tests, particularly thermal tests. The element can then be operated during use at lower temperatures, at which it can also be stressed.

A layered system consists, for example, of a sequence of individual layers which are adapted for a corresponding surface and/or component functionalization. In particular, the layered system can consist of a single layer, which is applied to a substrate. As application, one can mention, for example, optical or electrical functionalization. Optical functionalization can consist, for example, of a thin film interference filter, particularly in the fields of architectural glass, laser optics, communication/data transfer, decorative applications, eyeglass coatings, in general, anti-/reflective coating and mirror coating processes or similar applications. In addition, a layered system can also be provided to influence electrical layer properties, for example, particularly for transparent electrodes.

As the first and respectively second material one can choose particularly a metal, metal oxide, oxide, nitride or carbide, For example, one can have recourse to the oxide or nitrides of the metals Ti, Al, Si, Ta, Nb, Mg or similar materials which are customarily used for optical coatings. Similarly, it is possible to use transparent and conductive oxides.

The thickness of the layer should be, for example, in a range from a few nm to a few μm. In particular, a layer or layered system can present a thickness of several 10 μm.

The mixture profile can be established by the portions of the first material and of the second material, as a function of the layer thickness. The portions can be indicated, for example, as parts by volume. Alternatively, the parts can be specifically indicated as parts by weight.

The mixture profile preferably presents a steady, strictly continuous course over the layer thickness. The mixture profile may also vary only approximately continuously with the layer thickness. For example, the mixture profile can present a step-shaped variation, but without an interface layer between the first and second material. Rather, the mixture profile presents, particularly for each layer thickness, a mixture of the first and second material, which is between the first and second material. An only approximately continuous mixture profile can be advantageous, for example, because of industrial conditions relating to the coating process or for economic reasons.

The range of the varying mixed profile can extend, in one embodiment, over only a partial area of the layered system. In particular, a mixing ratio can be designed to be constant in an area adjacent, below or above, to the area of the mixture profile. For example, constant mixing areas may be located adjacently on both sides.

The layered system can be arranged in a thermally stressable element. For example, the layered system is embedded in the thermally stressable element. It can be arranged between two capacitor electrodes, for example.

According to a variant, the layered system is arranged on the thermally stressable element. In particular, the layered system is provided as a surface of the thermally stressable element.

According to a refinement, the layer presents a lower crystallization capacity in comparison with a layer having approximately the same thickness with discrete consecutive partial layers made of the first and of the second material. As a layer of approximately identical thickness one can use, as a substrate, for example, a conventional layer structure, which, in an optical layered system, is particularly an alternating sequence of high- and low-refractive index λ/4 layers. With an optical layered system, it is preferred to use a layered system for comparison, which produces an optical functionality which is at least approximately the same. For example, in each case, an approximately identically thick anti-reflective layered system for an identical anti-reflective wavelength range can be considered.

The temperature increase relates particularly to a reference value at room temperature. It is preferred to use as reference values a temperature increase to at least 400° C., more advantageously to at least 600° C., and particularly advantageously to at least 800° C.

Crystallization capacity should be understood particularly to denote the possibility of producing, within the layer, a transition of the layer material from an essentially amorphous state to a crystalline state, for example, by a temperature increase. In particular, in the case of amorphous metal oxide layers, for example, small crystals usually form with increasing temperature. The crystals grow specifically with temperature.

As a measure of the crystallinity of the layer one can have recourse, for example, to optical scattering. In particular, so-called haze at a light wavelength λ can be considered. The haze represents the light intensity which, during transmission at an angle of incidence of 0°, is scattered diffusely from the sample in the forward direction, i.e., in the direction of transmission, where the haze is normalized with respect to the intensity of the total transmitted intensity, which comprises both the diffuse and the oriented portion:

$$\text{Haze}(\lambda) = \frac{T_{diffuse}(\lambda)}{T_{total}(\lambda)} = \frac{T_{diffuse}(\lambda)}{T_{diffuse}(\lambda) + T_\perp(\lambda)}$$

To measure the haze, one usually uses an Ulbricht sphere in combination with a spectral photometer. It is preferred to observe the haze in a wavelength range. As a measure of the scattering capacity, it is preferred to assess a surface area that is located under the spectra in the light wavelength range that is of relevance for the filter under observation, and which is referred to below as the "integral haze value" ("Haze").

$$iHaze = \int_{\lambda_1}^{\lambda_2} \text{Haze}(\lambda) d\lambda$$

The wavelength should be used on a dimensionless basis in the integration according to the above procedure for the calculation of iHaze, which is preferably indicated in numerical values of nm. A high temperature stability of a sample will be apparent particularly if the scattering capacity is exceedingly low even after annealing.

In a variant, the layered system presents, in comparison with a layer of approximately the same thickness with discrete consecutive partial layers made up of the first and second material, at least in a temperature range of 400-800° C., an increase in the haze value which is at least 20% lower with respect to a particular haze value at room temperature.

In an additional variant, the layered system presents, in comparison with a layer of approximately the same thickness with discrete consecutive partial layers made up of the first and second material, at least in a temperature range of 400-800° C., an increase in the haze value which is at least 50% lower with respect to a particular haze value at room temperature.

According to an implementation, the haze value is here determined as an integral over a spectral range of 380-1500 nm. However, one may also consider the haze value for one or more individual wavelengths. In particular, the haze value in one or more spectral ranges can be used. Here, a spectral range that is particularly relevant for the functionality of the layered system is used.

In an additional implementation, the layered system presents a haze value of at most 120 integrated over a spectral range of 380-1500 nm at a temperature of 700° C. The wavelength must be used as the basis of the integration in accordance with the above procedure for the calculation of the iHaze in nm. For example, an infrared reflection filter can be provided, which presents a periodically alternating refractive index profile. An example of a layer thickness here is 5 μm.

In a refinement, at least in one light spectral range, the first material presents a first refractive index and second material presents a second refractive index that differs from the first one, where the layer additionally presents a refractive index profile that varies continuously with the layer thickness. In particular, the refractive index profile can be a function of the mixture profile. For example, the refractive index profile can be calculated by considering the effective medium from the mixture profile. Accordingly, a mixture profile curve can be determined, for example, from a given refractive index curve. The refractive index should be understood to be a complex refractive index here. If the absorption of the layer is negligible, it is preferred to use a real refractive index.

In an implementation, the layered system can be a component of a thin film interference filter. For example, the layered system can be embedded in additional layers of a thin film interference filter. For this purpose, the layered system can be surrounded on one or both sides by at least one conventional interference film stack. It is preferred for the layered system to be formed by the thin film filter. Similarly, a conventional layered system can be embedded on both sides of each layer with a continuous refractive index curve.

Different materials can be provided as the substrate, particularly for optical layered systems. In a first variant, the layered system presents a substrate from the group comprising quartz, float glass and $Al_2O_3$. Such a substrate is preferably chosen in the case of an optical layered system for the spectral range that is visible to the human eye, which extends approximately from 380 nm to 750 nm, and/or the near infrared spectral range, which extends approximately from 750 nm to 1500 nm.

In an additional variant, the layered system presents a substrate from the group comprising silicon and germanium. Such a material is chosen particularly with an optical layered system for an infrared spectral range at wavelengths above 1500 nm.

For the mixture profile, different curves can be provided. In a first embodiment, the mixture profile comprises a periodic profile. In particular, the mixture profile presents a curve that is a function of layer thickness, where the curve can always be differentiated. For example, the curve presents a number of minima and maxima.

In an additional implementation of the periodic profile, an apodization of the periodic profile is provided. In particular, the layer comprises at least one rugate filter.

According to an additional implementation, the layer is a gradient layer. For example, a continuous increase of the mixture profile starting from a substrate can be provided.

In a refinement, the layered system preferably presents an optical filter from the group comprising an edge filter, bandpass filter, anti-reflection layer and mirror coating. For example, a single layer can be provided with a continuous refractive index curve on a substrate as optical filter. The layered system, in a variant, can also comprise an optical filter and an additional function layer, particularly a scratch-resistant layer. In a variant, at least one layer with a continuous refractive index curve can be surrounded on one or both sides by at least one conventional interference layer stack. In particular, a layered system can be provided, which presents alternately one or more layers with a continuous refractive index curve and also one or more conventional interference layer stacks. Similarly, a conventional layered system can be embedded on both sides in each case with a layer presenting a continuous refractive index curve.

Different materials can be provided as the first and/or second material, particularly for an optical layered system. For an application of the layered system in the visible or near infrared spectral range, it is preferred to choose the first and/or the second material from the group comprising $SiO_2$, MgF, $Al_2O_3$, $TiO_2$, $Si_3N_4$, $Ta_2O_5$, $Nb_2O_5$, HfO, $SnO_3$, ZnO, $Bi_2O_3$, $ZrO_2$ and $ZrO_2$:Y. In particular, the first material is chosen from the group comprising $SiO_2$, MgF, and $Al_2O_3$. The second material is chosen preferably from the group comprising $TiO_2$, $Si_3N_4$, $Ta_2O_5$, $Nb_2O_5$, HfO, $SnO_3$, ZnO, $Bi_2O_3$, $ZrO_2$ and $ZrO_2$:Y.

In a variant, the first and/or second material is/are chosen, particularly for an application in the infrared or far infrared spectral range, from the group comprising $SiO_2$, Si and Ge. It is preferred to choose $SiO_2$ as the first material and Si or Ge as the second material.

According to an additional variant, the first material is chosen to be oxidic and second material non-oxidic. For example, the second material can be an oxide of the first material. Accordingly, the second material can be, for example, a nitride of the first material.

In an implementation of an optical layered system, the layer comprises a rugate filter that presents $SiO_2$ as the first material and $Ta_2O_5$ as the second material. Thus, the refractive index profile can be adjusted particularly to approximately 1.46-2.2.

According to an additional implementation, the layer comprises a rugate filter that presents $SiO_2$ as the first material and $Nb_2O_5$ as the second material. Thus, the refractive index profile can be adjusted particularly to approximately 1.46-2.4.

In another implementation, the layer comprises a rugate filter that presents $SiO_2$ as the first material and tantalum zirconium oxide as the second material. Thus, the refractive index profile can be adjusted particularly to approximately 1.46-2.3.

In a refinement, the layered system presents a lower angular dependence of the reflection and/or transmission in comparison with a layer of approximately the same thickness with discrete consecutive partial layers made up of the first and second materials. This preferably allows a functionality of an optical system to be improved. For example, the degree of effectiveness of a solar absorber system can be improved.

Alternatively or in addition to the described implementations according to a variant, the layer represents a diffusion barrier. It is preferred for the diffusion barrier to present an elevated thermal stability in comparison with a conventional layer. Advantageously, diffusion through grain boundaries, which form during crystallization, is prevented as a result of reduced crystallization capacity during a temperature increase.

In another refinement, the layered system is provided as an insulation layer in a apacitor. A lower crystallization capacity advantageously allows a decreased temperature dependence of the dielectric function of the insulator layer. This allows, particularly, an improved temperature stability of an electrical circuit.

In an additional implementation, the layered system is provided in or/and on a semiconductor component. For example, an insulation layer can be designed to be heat resistant. For example, the layered system can be provided as a gate electrode, in a storage element, a varistor, a transistor or similar device.

According to a refinement, the thermally stressable element is a thermally stressed lighting means according to at least one of the previously described embodiments. For example, it can be a projector lamp. It is preferred to further reduce the size of a projector lamp in comparison with a projector lamp with a conventional coating. In particular, the efficiency of an imaging system in a projector can be improved. It is preferred to reduce imaging from scattered light on a projector aperture.

In an additional refinement, the thermally stressable element is a solar collector according to at least one of the previously described embodiments. It is preferred to use the layered system to increase efficiency. For this purpose, for example, an infrared reflector with a steep edge at 3.5 µm can be used to optimize the ratio of coupled solar radiation and reflected absorption radiation. In addition, it is preferred to make possible, besides a high temperature resistance, as low as possible an angular dependence of the function of the layered system under preferably nearly all angles between 0° and 90°.

In an additional implementation, the thermally stressable element used according to at least one of the previously described embodiments is a thermally pre-stressable glass. In particular, the layered system is in the form of a layered system that has been applied in an annealing step to thermally pre-stressed glass. The optical function layer, which is applied before an annealing process, preferably undergoes no or at least only a slight reduction of optical quantity during the annealing process, particularly with respect to the optical scattering properties.

Moreover, the invention relates to a component, particularly an optical component, which comprises at least one layered system according to at least one of the previously described embodiments. A component is, for example, an optical lens, a viewing window, a transparent conductive electrode or similar devices. In addition, the component used can be, for example, a capacitor or a semiconductor construction element. In particular, a solar absorber, a lamp body, a window pane or similar devices can be used as the component.

Finally, the invention relates to a method for the manufacture of a layered system of a thermally stressable element according to at least one of the previously described implementations, wherein, on a substrate, at least one layer with at least a first and at least a second material different from the first is deposited, where a mixture profile of the first and second material is adjusted to vary nearly continuously with a layer thickness.

In particular, the layered system presents, during a temperature increase, a lower crystallization capacity than a conventional layered system of approximately the same thickness.

For such a coating method, an embodiment provides that the first and the second materials are deposited by means of a vacuum coating method. For this purpose, for example, a physical vapor phase deposition, PVD, a chemical vapor phase deposition, CVD, or a physically activated chemical vapor phase deposition is used. As PVD processes, for example, DC-, RF- or IF-sputtering processes can be used. Moreover, a thermally or electron beam guided vapor deposition method can be used. Alternatively or additionally, an ion-supported process can be used, for example, with at least one ion source. In particular, an ion beam sputtering process can be used. The deposition temperature is preferably less than 100° C.

In a refinement, the first and the second material are deposited using a co-sputtering process. Deposition occurs here, for example, using sputter targets made in each case of the first and the second material, respectively. For example, if $TiO_2$ is chosen as the first material and $SiO_2$ as the second material, a sputter target made of $TiO_2$ and one made of $SiO_2$ are used. However, it is also possible to sputter the first and/or second material of each metal target in a reactive gas atmosphere. In this case, the formation of the first and of the second material respectively occurs particularly on the layer. In a magnetron sputter process, Ar, for example, is used as the sputter gas, at a pressure of approximately $1.3 \times 10^{-3}$ mbar. Oxygen, for example, is used as the reactive gas. If, for example, $TiO_2$ is selected as the first material and $SiO_2$ the second material, then a sputter target made of Ti and one made of Si is used in a reactive process.

In another implementation, the first and the second material are deposited by a co-evaporation process. In particular, a thermal or an electron-beam guided evaporation process is chosen in each case. It is also possible for one material to be vaporized by means of an electron beam and the second thermally.

In a refinement, the layered system is deposited on a glass substrate and the glass substrate is subjected to thermal tension in an additional step. The optical function coating undergoes preferably no or at least only a slight reduction in optical quality in the second step, particularly with respect to the optical scattering properties.

BRIEF DESCRIPTION OF THE DRAWINGS

The invention is described in detail below using an example with reference to the drawings. However, the invention is not limited to the combination of characteristics represented there. Rather, in each case, characteristics contained in the drawing as well as in the description, including the description of the figures, can be combined with each other to produce refinements.

The drawings show.

DETAILED DESCRIPTION OF THE PRESENT INVENTION

Figure 1:
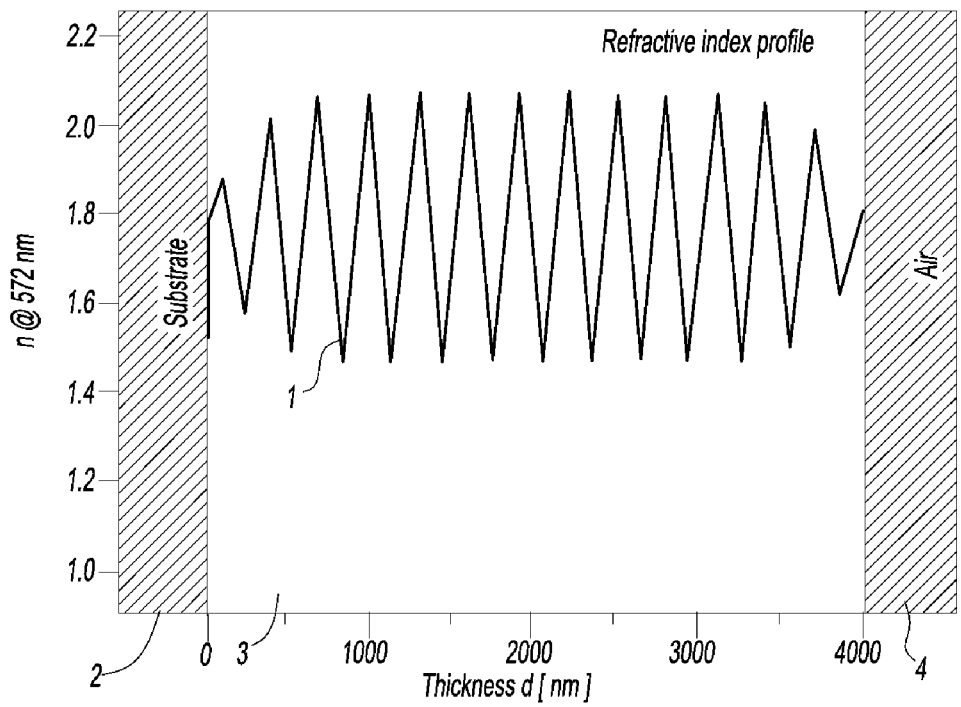
FIG. 1 is a continuous refractive index profile of a first layered system.

FIG. 1 shows a continuous refractive index profile 1 of a first layered system. The layer thickness is plotted on the abscissa. The refractive index at a wavelength of 572 nm is plotted on the ordinate. Absorption is negligible, and therefore the refractive index is a real number. A schematic representation shows the substrate 2, which, at layer thicknesses of less than 0 nm, is arranged on the axis, as well as the layer 3, which presents a continuous refractive index profile and which extends to approximately 4 μm. This is followed by a half space "air" 4 as exit medium. The layer design used was a mirror coating at a wavelength of 1064 nm. The refractive index profile represented corresponds to a time before the annealing step.

This first layered system is deposited from the base materials $SiO_2$, as first material, and $Ta_2O_5$, as second material, in an RF magnetron sputter installation. In connection with the radio frequency excitation, called RF excitation, ceramic sputter targets made of $SiO_2$ or $Ta_2O_5$ were used. The layered deposition occurred at a constant overall power of 800 W and with variable performance proportions on the cathodes or sputter targets in an $Ar/O_2$ atmosphere at approximately $1.5 \times 10^{-3}$ mbar. Depending on the desired mixture profile of the first and second material, the power portions were varied. However, the cathode was never completely switched off here; rather, it was operated at a minimum power of at least 100 W during the coating process. An extreme power distribution over the two cathodes therefore corresponded to a ratio of 100 W to 700 W. Accordingly, the mixture profile presents no points with a pure composition of first or second material. In particular, the layer for each layer thickness always contains at least small portions of the first and at least small portions of the second material. It is preferred for small portions of the first or second material to lead already to an inhibition of crystallization in a mixture of the materials.

The apparatus structure described makes it possible to achieve a continuous refractive index profile of, in each case, the first or second material, respectively, in the layer by a power variation, particularly by a temporal power variation.

In an embodiment, which is not shown, the first and second material can be sputtered by reaction from metal targets. In the process, for example, a Si target and a tantalum target can be atomized in a reactive argon-oxygen atmosphere. In particular, one must take into consideration here a coupling of the two simultaneously running processes via the oxygen partial pressure using a control device.

In addition, one can provide for the deposition of the first material and second material in a co-evaporation process. Here, in each case, a thermal or an electron beam-guided evaporation process can be selected. In particular, one material can be vaporized by means of an electron beam and the second material thermally.

As the refractive index curve of the first layered system, a periodic rugate filter was used. The refractive index curve here presents a sinusoidal modulation with an apodization. As apodization, a curve according to a function $\exp(-x^4)$ was selected.

Below, elements that have the same effect are designated by the same reference numerals.

Figure 2:
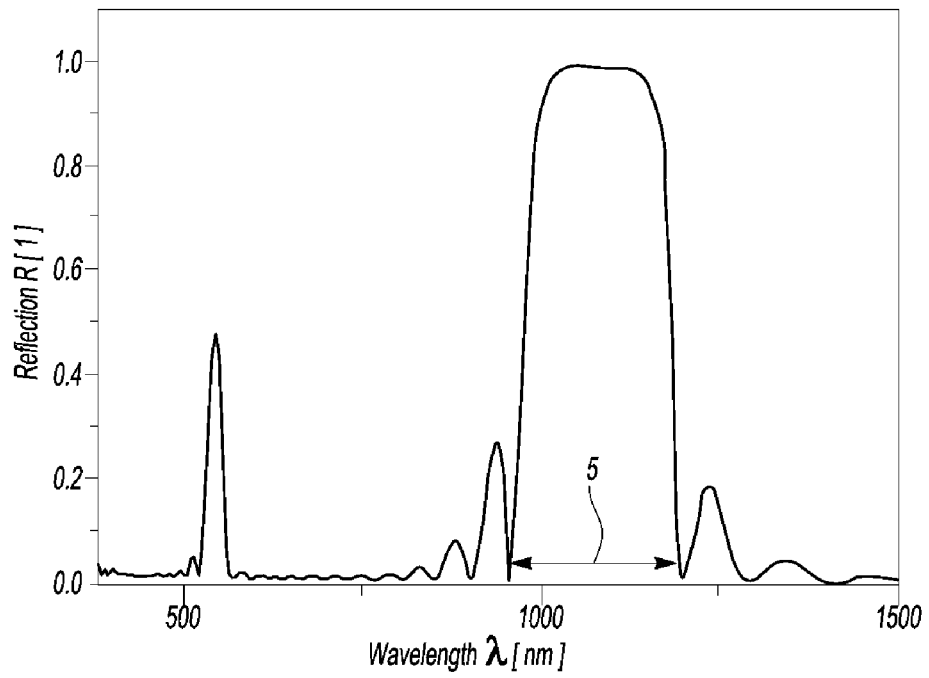
FIG. 2 is a reflection curve of the first layered system.

FIG. 2 shows the associated reflection curve of the first layered system in case of orthogonal incidence. The wavelength is plotted in nm on the abscissa and the reflection with orthogonal incidence is plotted on the ordinate. The reflection presents a small-band area 5 with nearly total reflection in the area around the mirror coating wavelength of 1064 nm.

Figure 3:
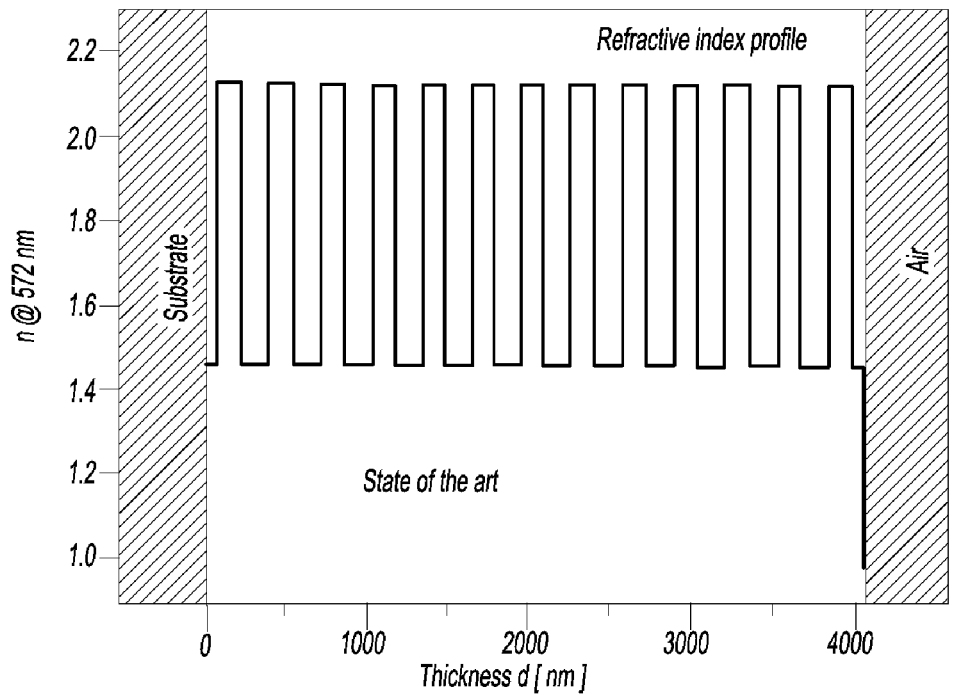
FIG. 3 is a discrete refractive index profile of a second layered system according to the state of the art.

FIG. 3 shows a discrete refractive index profile of a second layered system according to the state of the art. The refractive index profile at a wavelength of 572 nm is represented at a time before an annealing step. Absorption is negligible, and therefore the refractive index is a real number. The second layered system was represented in comparison with the first layered system, where care was taken to ensure that the first layered system and second layered system present approximately the same thickness. As layer design, a mirror coating at a wavelength of 1064 nm with a conventional λ/4 stack was chosen.

Figure 4:
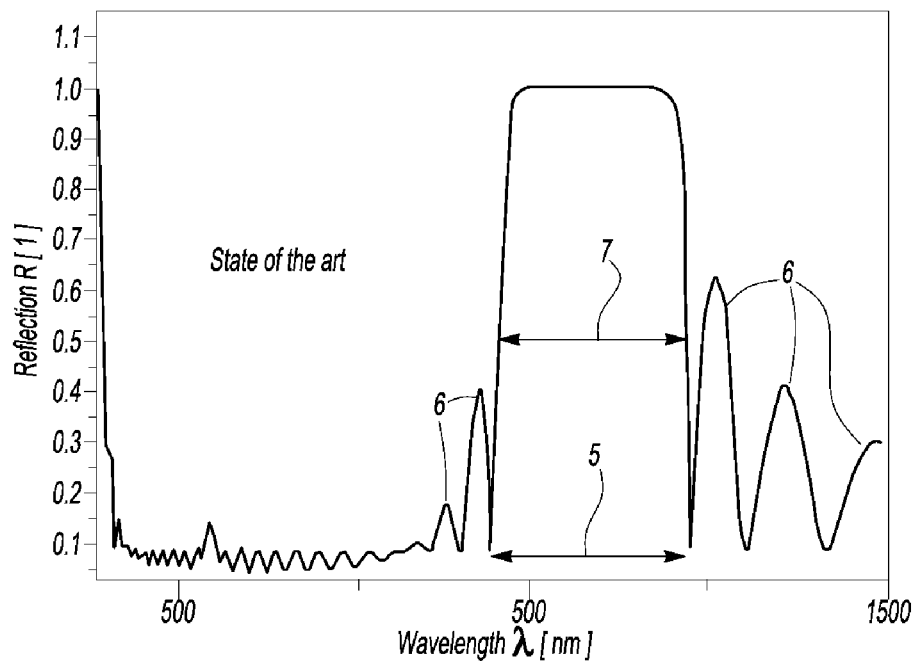
FIG. 4 is a reflection curve of the second layered system.

FIG. 4 shows the associated reflection curve of the second layered system. The wavelength is again plotted in nm on the abscissa and the reflection with orthogonal incidence on the ordinate. The reflection shows a small-band area 5 with nearly total reflection in the area around the mirror coating wavelength of 1064 nm. In contrast to the reflection of the first layered system shown in FIG. 2, one can clearly see more pronounced secondary maxima 6. Moreover, the reflection curve presents a greater width at half maximum intensity 7.

Figure 5:
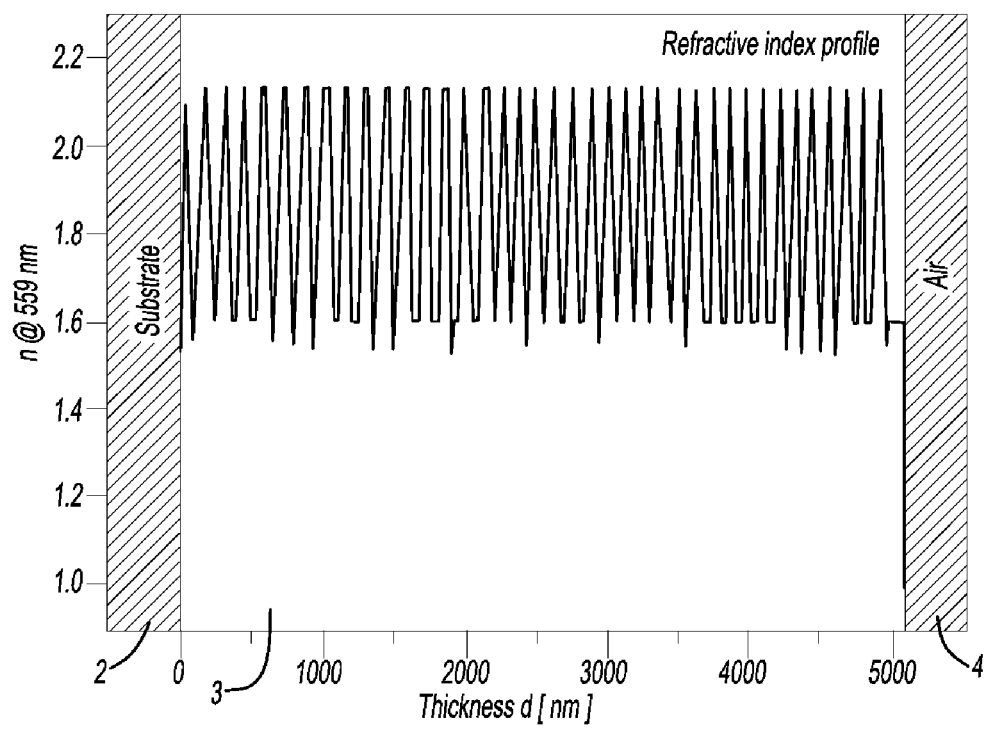
FIG. 5 is a continuous refractive index profile of a second layered system.

FIG. 5 shows a continuous refractive index profile of a third layered system and a wavelength of 559 nm. Because of the negligible absorption, the refractive index is again a real number. This system presents a layer design which is in the form of an edge filter in view of an application. The layered system for flashing light glass coatings here is intended to make available a slanted edge 8 at approximately 550 nm. The third layered system was also deposited, like the first and second layered system, with $SiO_2$ as the first material and $Ta_2O_5$ as the second material. The layered system consists of a layer with a continuously varying refractive index profile that is applied to a substrate. This is represented schematically in the representation. The layer thickness is plotted on the abscissa. The refractive index is plotted on the ordinate. The substrate, in the case of layer thicknesses of less than 0 nm, is arranged on the axis, where the layer that presents a continuous refractive index profile extends to approximately 5 μm. It is followed by a schematically represented half space "air" as exit medium.'

The refractive index profile is represented at a time before an annealing step. The refractive index profile is a periodically varying profile that oscillates between a refractive index of 1.54 and 2.14.

Figure 6:
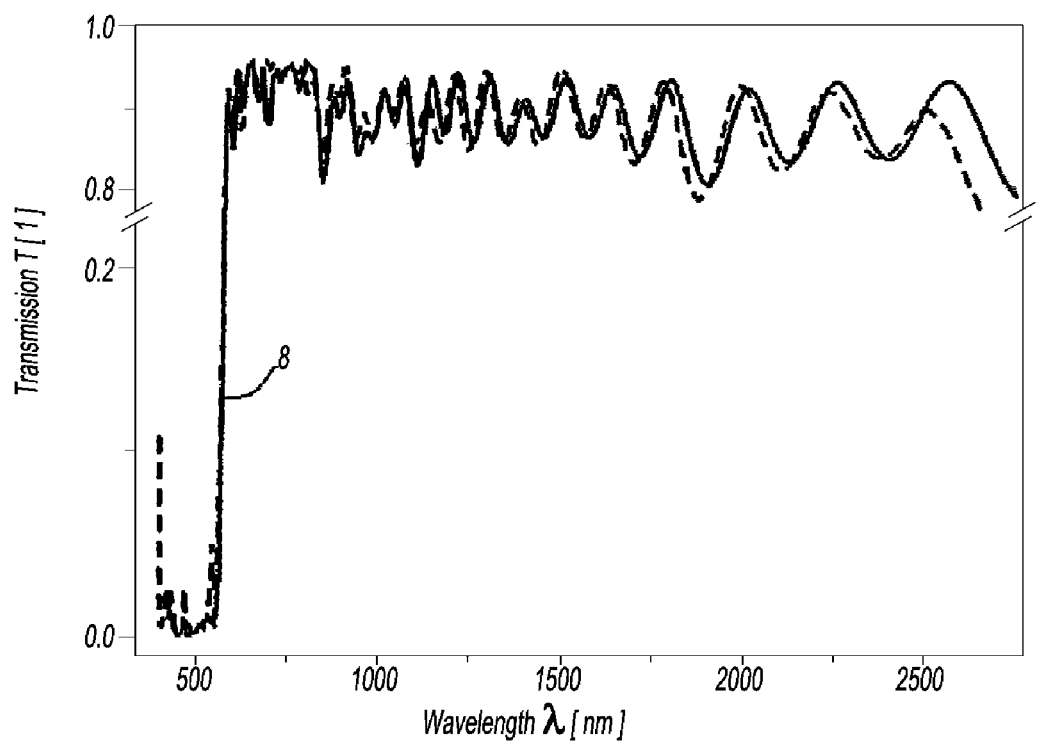
FIG. 6 is a reflection curve of the third layered system.

FIG. 6 shows an associated transmission curve of the third layered system. The spectral curve again presents a sharp edge at approximately 550 nm. Above this edge 8, the third layered system transmits almost completely. Below the edge 8, the transmission is reduced almost to zero. The measured transmission curve is represented as a broken line. The solid line shows a calculated curve, where material absorption was neglected.

Figure 7:
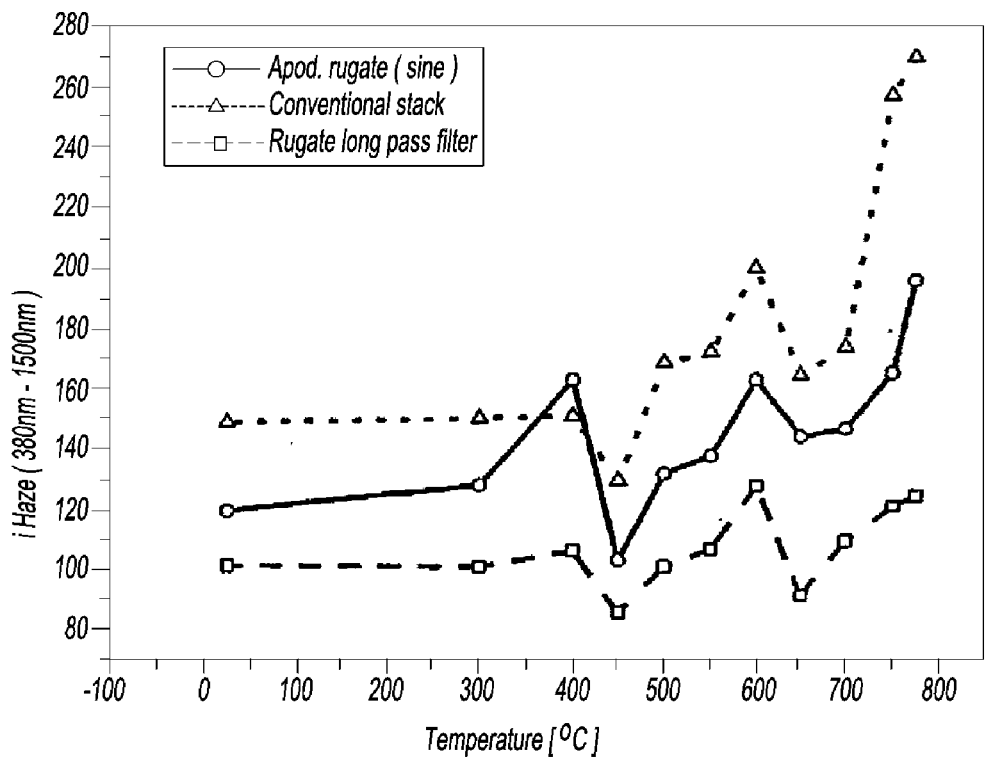
FIG. 7 is a dependence of an integral haze value of the three-layered systems on the temperature.

FIG. 7 shows a dependence of an integral haze value of the three-layered systems on temperature. For the evaluation of the heat resistance, the samples were subjected to an annealing test sequence, where they were exposed in each case for 1 h to temperatures that are successively increased each time by 50° C. After each annealing step, the samples were measured by X-ray diffractometry, XRD, and directional as well as integral spectrophotometry measurements of the reflection R and the transmission T. The spectrophotometric measurements were carried out particularly to determine the integral haze value. As spectral range, the wavelength range from 380 nm to 1500 nm was used. This allowed a direct comparison of the optical properties of "mixed oxide" filters with a continuous mixed profile or refractive index profile on the one hand, and conventional interference filters, on the other hand, under thermal stress.

Specifically, the first, second, and third systems were annealed, starting at a temperature of 400° C., successively in each case for 1 h, analyzed, and again exposed in a new temperature step to a 50° C. higher temperature. As reference value, a value at room temperature was recorded in each case. The temperature is plotted on the abscissa, and the integral haze phase on the ordinate. The solid line shows the curve of the first layered system. The broken line with the measurement points represented as triangles shows the curve for the second layered system, and the third line with the measurement points represented as squares shows the curve for the third layered system.

The temperature dependence of the integral haze value clearly shows that the first and third layered system, which present a continuous mixture profile curve or refractive index curve, present a lower increase in scattering with temperature. In particular, this shows a reduced tendency for crystals to form, which lead to an increase of the optical scattering capacity and of the integral haze value.

The second, conventional, layered system presents an increase of the integral haze value to a maximum of approximately 270 at 775° C. starting from a value of approximately 150 at 0° C. The increase is approximately 80%.

The first layered system presents an increase of the integral haze value to a maximum of approximately 195 at 775° C. starting from a value of approximately 120 at 0° C. The increase is thus approximately 63%.

The third layered system presents an increase of the integral haze value to a maximum of approximately 120 at 775° C. starting from a value of approximately 100 at 0° C. The increase is thus approximately 20%.

It was found that, in the considered temperature range up to 775°, in the case of the first layered system, the increase obtained is approximately 21% lower than in the case of the second conventional system.

For the third layered system, in the temperature range considered, the increase was found to be approximately 75% lower than in the case of the second conventional system.

It is preferred for the second system, as already mentioned above, to present already an increased temperature stress capacity compared to a similar layered system with a layer sequence of pure materials.

Figure 8:
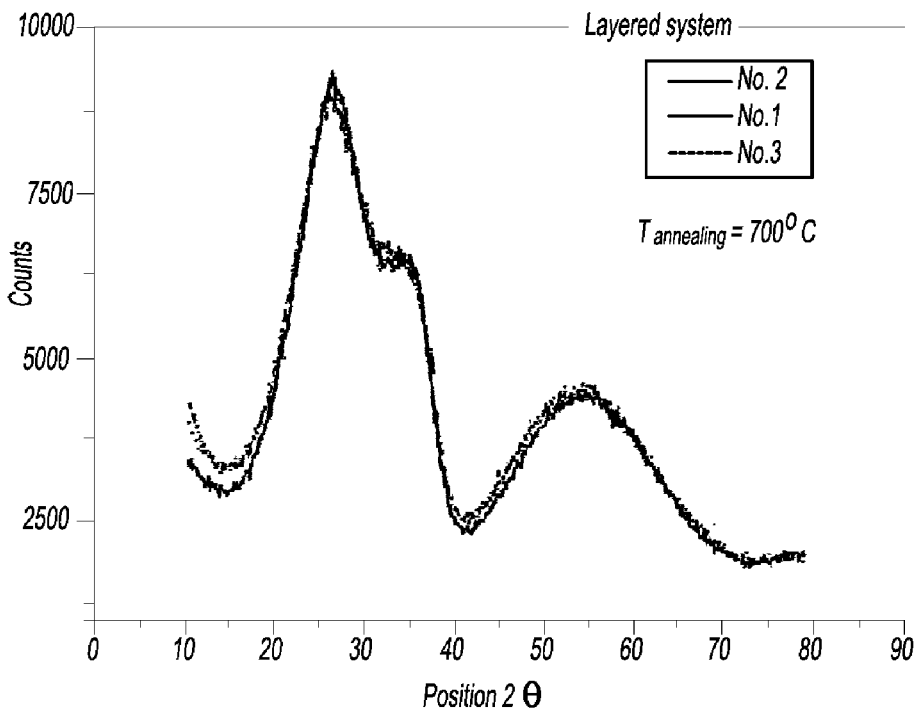
FIG. 8 is an X-ray spectra of the three-layered systems according to an annealing step at 700° C.

FIG. 8 shows X-ray spectra of the three-layered systems after an annealing step at 700°. A counting tube intensity is plotted on the ordinate and a value equal to twice the angle of incidence of an X-ray radiation used for the measurement is plotted in degrees on the abscissa. In the 2θ scan represented, no crystalline portion can be seen in the layered systems. Rather, they are amorphous.

Figure 9:
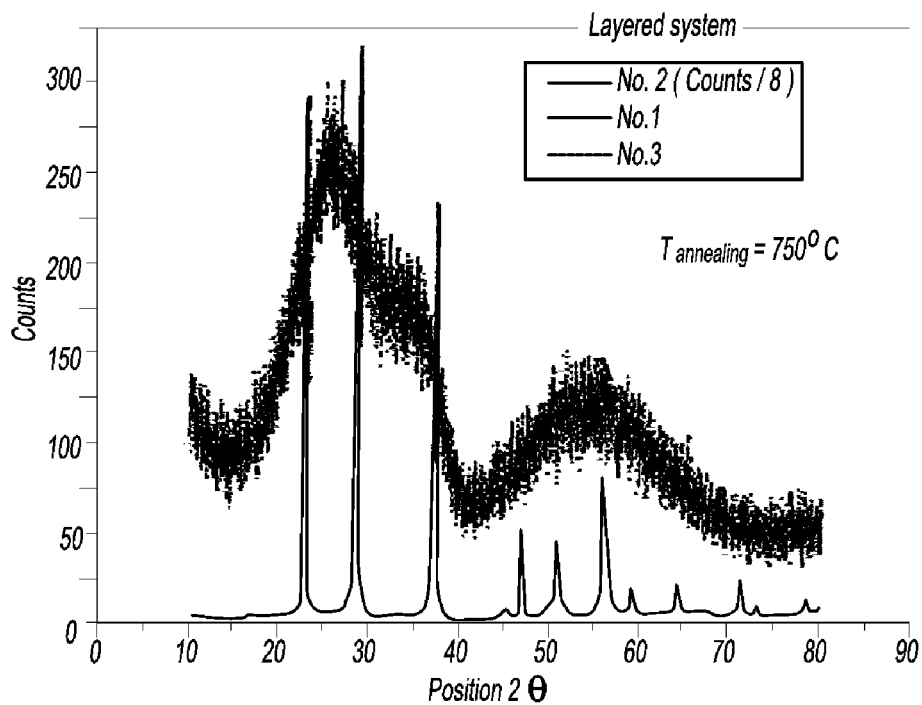
FIG. 9 is an X-ray spectra of the three-layered systems according to an annealing step at 750° C.

FIG. 9 shows X-ray spectra of the three-layered systems after an annealing step at 750°. After all the samples continue to be amorphous at 700° C., the second, conventional, layered system has here already crystallized completely. However, the first and the third layered system, each of which present a continuous refractive index curve, continue to be amorphous. To facilitate the representation, the counting tube intensity of the measurement of the second layer was divided by the factor 8.

Figure 10:
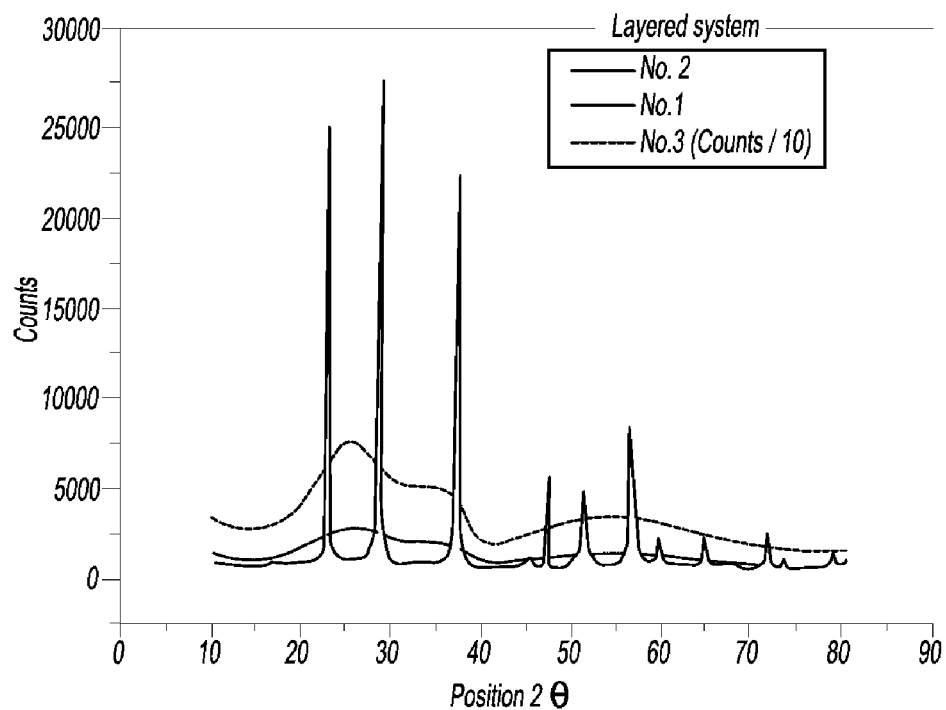
FIG. 10 is an X-ray spectra of the three-layered systems according to an annealing step at 775° C.

FIG. 10 shows X-ray spectra of the three-layered systems after an annealing step at 775°. To facilitate the representation, the counting tube intensity of the measurement of the third layer was divided by a factor of 8. In an additional temperature increase to 775° C., the first layered system, which presents a refractive index curve according to an apodized sine function, begins to crystallize. However, this process is not yet completed at 775° C. The X-ray spectra show that the first layered system contains both crystalline and also larger still amorphous portions, while the second, conventional, layered system has completely crystallized. In contrast, the third layered system is still completely amorphous. Thus, there is a clear improvement in comparison with the second conventional layered system.

Figure 11:
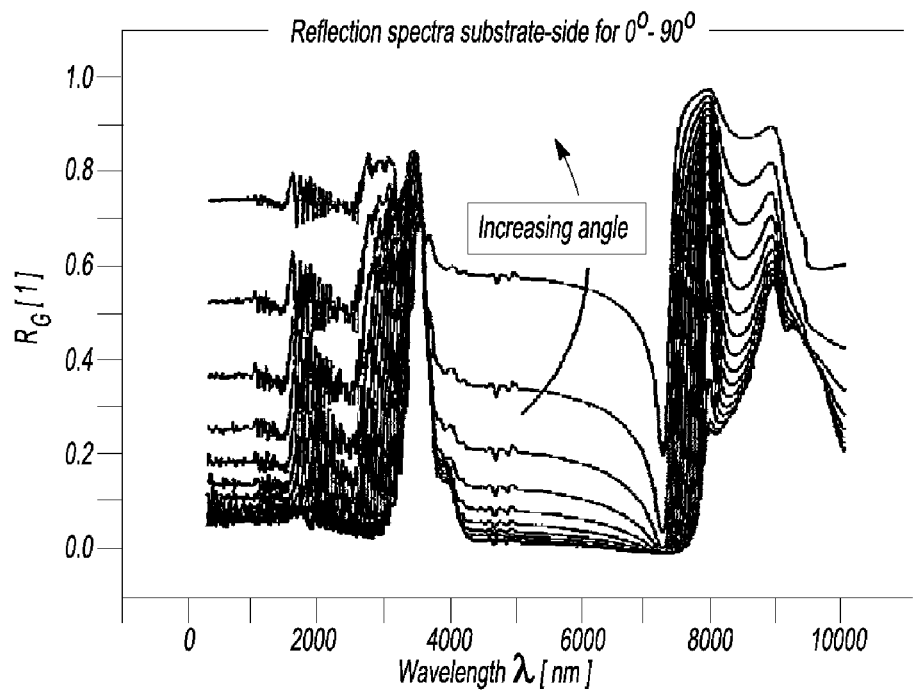
FIG. 11 is an angular dependence of the substrate-side reflection of a fourth layered system.

FIG. 11 shows an angular dependence of the substrate-side reflection of a fourth layered system. This fourth layered system is an infrared reflection filter, for example, for applications on quartz windows of solar receivers for protecting the substrate from black body radiation of the absorber and for increasing the efficiency by including stray power. To the extent possible, a desired property of this filter system is negligible absorption in the solar light spectral range in connection with as high as possible a reflection for absorber radiation. In particular, it is desired to make this functionality available for an extremely large angular range. The reflection spectra that are represented were calculated for various angles from 0° to 90°, where the angles were varied in each case in 10° steps. The reflection measurements were carried out in each case through the substrate. A quartz glass was used as substrate. It was a 5-mm thick substrate of type GE 214. It presents increasing reflection in the wavelength range of 4000-8000 μm with increasing angle.

Figure 12:
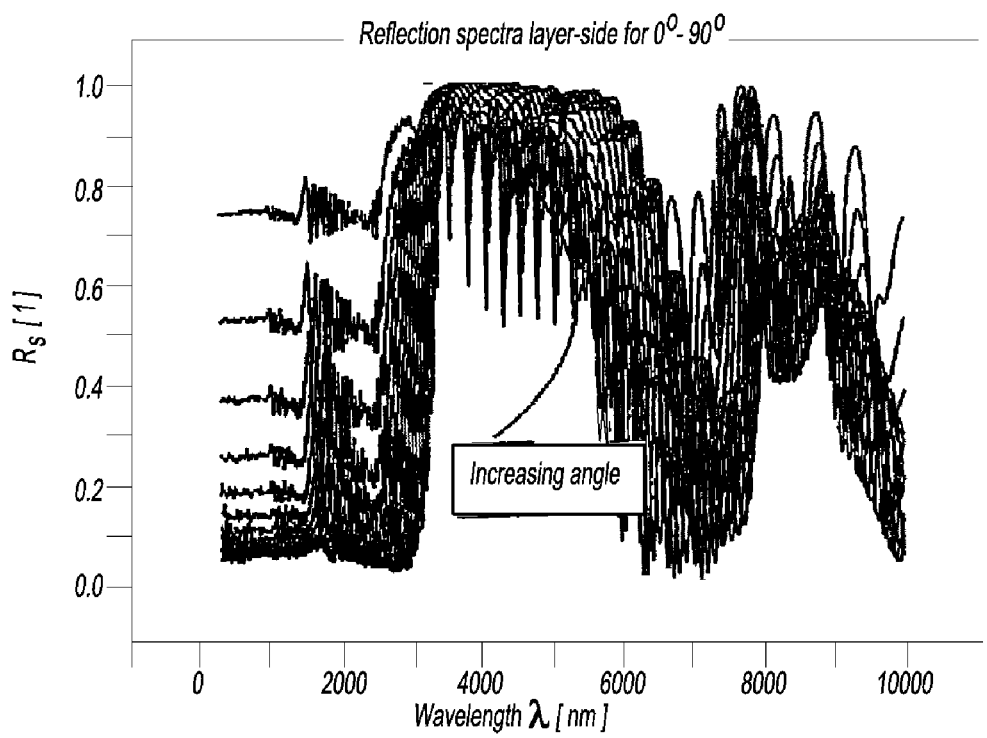
FIG. 12 is an angular dependence of the layer-side reflection of the fourth layered system.

FIG. 12 shows an angular dependence of the layer-side reflection of the fourth layered system. The reflection spectra represented were calculated for different angles from 0° to 90°, where the angles were varied in each case in 10° steps. The calculation is indicated in each case for reflection from the layer side. Again, the reflection was found to increase with increasing angle in the wavelength range of 4000-8000 μm.

Figure 13:
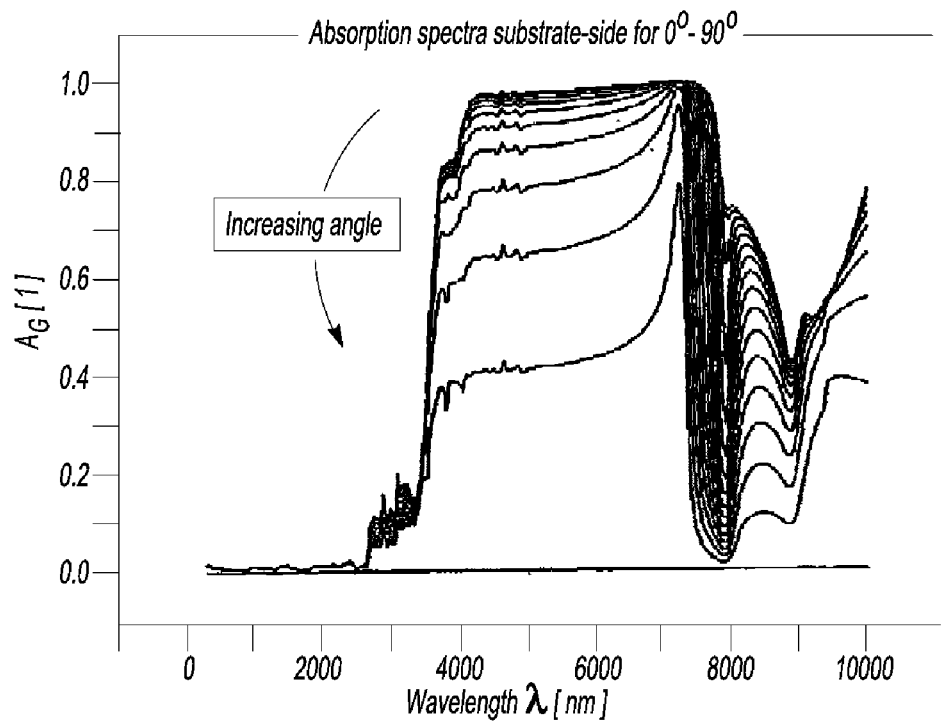
FIG. 13 is an angular dependence of the substrate-side absorption of the fourth layered system.

FIG. 13 shows an angular dependence of the substrate-side absorption of the fourth layered system. The absorption spectra represented were calculated for different angles from 0° to 90°, where the angles were varied in each case in 10° steps. The calculation of the absorption was carried out in each case talking into account the light incidence on the substrate side. The absorption was found to decrease with increasing angle in die wavelength range of 4000-8000 μm.

Figure 14:
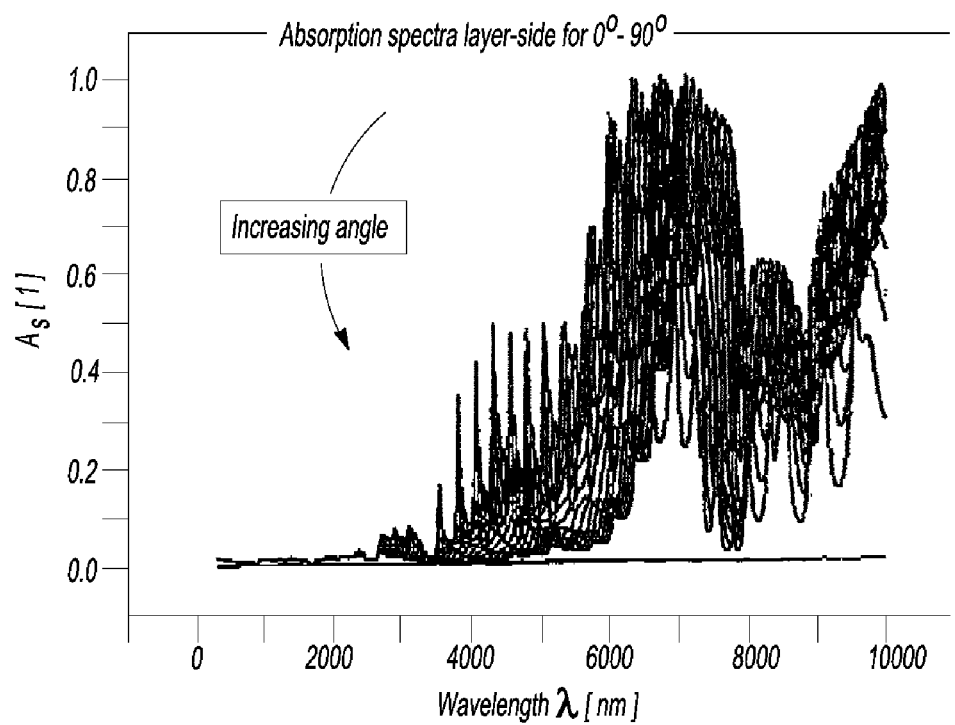
FIG. 14 is an angular dependence of the layer-side absorption of the fourth layered system.

FIG. 14 shows an angular dependence of the layer-side absorption of the fourth layered system. The absorption spectra represented were calculated for different angles from 0° to 90°, where the angle was varied in each case in 10° steps. The calculation of the absorption was carried out based on light incidence from the layer side. Again, the absorption was found to decrease with increasing angle in the wavelength range of 4000-8000 μm.

Figure 15:
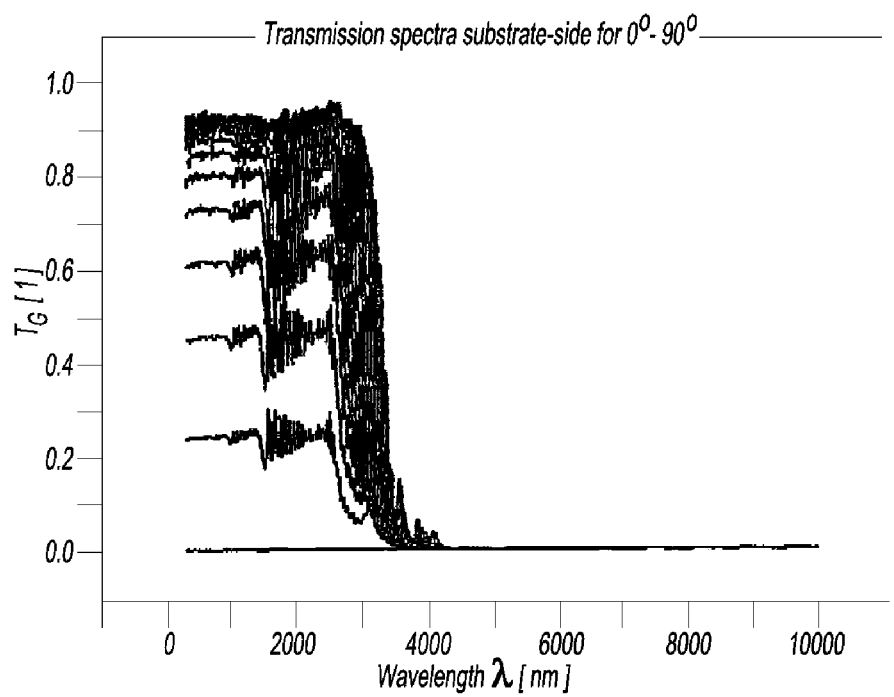
FIG. 15 is an angular dependence of the substrate-side transmission of the fourth layered system.

FIG. 15 represents an angular dependence of the substrate-side transmission of the fourth layered system, Specifically, the transmission spectra represented were calculated for different angles from 0° to 90°, where the angle is varied in each case in 10° steps. The transmission measurements were carried out in each case on the basis of a light incidence from the substrate side. The transmission was found to decrease with increasing angle in the visible spectral range.

Figure 16:
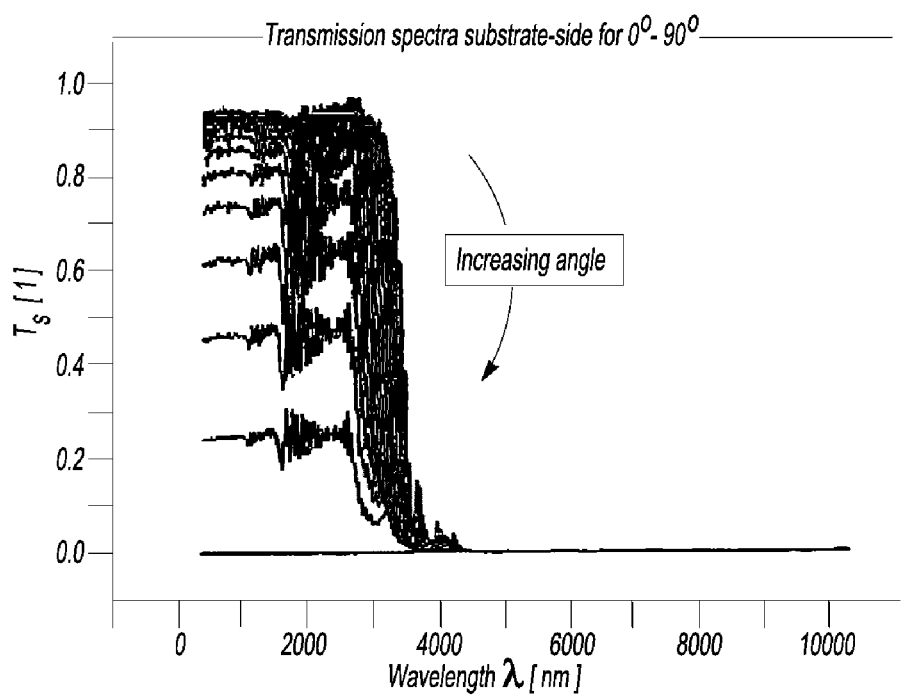
FIG. 16 is an angular dependence of the layer-side transmission of the fourth layered system.

FIG. 16, finally, shows an angular dependence of the layer-side transmission of the fourth layered system. Specifically, again the represented transmission spectra were calculated for various angles from 0° to 90°, where the angle was varied in each case in 10°steps. The calculation was carried out in each case taking into consideration light incidence from the substrate side. As expected, the spectra, due to the optical reciprocity, correspond to the spectra shown in FIG. 14, which were calculated for transmission from the layer side.

The foregoing drawings, discussion and description are illustrated of specific embodiments of the present invention, but they are not meant to be limitations upon the practice thereof. Numerous modifications and variations of the invention will be apparent to those of skill in the art in view of the teaching presented herein. It is the following claims, including all equivalence, which define the scope of the invention.

We claim:

1. A thin film interference filter having a thermally stressable element with at least one layer, said filter comprising: alternating layers of at least a first and at least a second material in the at least one layer, and a mixture profile of the alternating layers of the first and second material in the at least one layer that varies at least approximately continuously with a layer thickness, without the formation of an interface layer between the alternating layers of the first and second material, whereby the at least one layer presents a lower crystallization capacity in comparison with a layer of approximately the same thickness with discrete successive partial layers made up of the first and the second material, whereby in at least one light spectral range, the first material presents a first refractive index and the second material presents a second refractive index that is different from the first refractive index, and the layer presents a refractive index profile that varies continuously with the layer thickness.

2. The filter according to claim 1, characterized in that the filter is arranged on the thermally stressed element.

3. The filter according to claim 1, characterized in that the filter, at least in a temperature range from 400° C. to 800° C., presents, in comparison with a layer having approximately the same thickness with discrete successive partial layers made up of the first and of the second material, an increase of the haze value that is lower by at least 20% with respect to the given haze value at room temperature.

4. The filter according to claim 1, characterized in that the filter, at least in a temperature range from 400° C. to 800° C., presents, in comparison with a layer having approximately the same thickness with discrete successive partial layers made up of the first and of the second material, an increase of the haze value that is lower by at least 50% with respect to the given haze value at room temperature.

5. The filter according to claim 1, characterized in that a haze value is determined in a spectral range from 380 nm to 1500 nm as an integral value.

6. The filter according to claim 1, characterized in that, at a temperature of 700° C., the filter presents an integrated haze value in a spectral range of 380-1500 nm of at most 120.

7. The filter according to claim 1, characterized in that the filter presents a substrate selected from the group consisting of quartz, float glass and $Al_2O_3$.

8. The filter according to claim 1, characterized in that the filter presents a substrate selected from the group consisting of silicon and germanium.

9. The filter according to claim 1, characterized in that the mixture profile comprises a periodic profile.

10. The filter according to claim 9, characterized in that an apodization of the periodic profile is provided.

11. The filter according to claim 1, characterized in that the at least one layer comprises at least one rugate filter.

12. The filter according to claim 1, characterized in that the at least one layer is a gradient layer.

13. The filter according to claim 1, characterized in that the filter presents an optical filter selected from the group consisting of an edge filter, bandpass filter, anti-reflection layer and mirror coating.

14. The filter according to claim 1, characterized in that the first and/or second material is selected from the group consisting of metal oxide, metal fluoride and metal nitride, where the metal is specifically selected from the group of transition metals.

15. The filter according to claim 1, characterized in that the first and/or the second material is selected from the group consisting of $SiO_2$, Si and Ge.

16. The filter according to claim 1, characterized in that the first material is oxidic and second material is non-oxidic.

17. The filter according to claim 1, characterized in that the layer comprises a rugate filter, with $SiO_2$ as the first material and $Ta_2O_5$ as the second material.

18. The filter according to claim 1, characterized in that the layer comprises a rugate filter, with $SiO_2$ as the first material and $Nb_2O_5$ as the second material.

19. The filter according to claim 1, characterized in that the layer comprises a rugate filter, with $SiO_2$ as the first material and tantalum zirconium oxide as the second material.

20. The filter according to claim 1, characterized in that the layered system presents a lower angular dependence of the reflection and/or transmission in comparison with a layer of approximately the same thickness with discrete successive partial layers made up of the first and second material.

21. The filter according to claim 1, characterized in that the layer represents a diffusion barrier.

22. The filter according to claim 1, characterized in that the filter is provided as insulator layer in a capacitor.

23. The filter according to claim 1, characterized in that the filter is provided in or/and on a semiconductor element.

24. The filter according to claim 1, characterized in that the thermally stressed element is a thermally stressed lighting means.

25. The filter according to claim 1, characterized in that the thermally stressed element is a solar collector.

26. The filter according to claim 1, characterized in that the thermally stressed element is a thermally pre-stressed glass.

27. A component, particularly an optical component, comprising at least a filter according to claim 1.

28. A layered system with at least one layer, which presents alternating layers of at least a first and at least a second material, and which presents a mixture profile that varies at least approximately continuously with a layer thickness, without the formation of an interface layer between the alternating layers of first and second material, on a thermally stressed element, wherein the layered system is arranged on the thermally stressed element, and a thermal stress between approximately 400° C. and 1000° C. is present, where a mixing ratio is constant in an area which is adjacent, below and above, to the mixture profile.

29. A layered system with at least one layer, which presents alternating layers of at least a first and at least a second material, and which presents a mixture profile that varies at least approximately continuously with a layer thickness, without the formation of an interface layer between the alternating layers of the first and second material, on a thermally stressable element, where the layered system is embedded in the thermally stressable elements.

* * * * *